3,369,897
PHOTOGRAPHIC MATERIALS CONTAINING PYR-
AZOLO - [1,5α] - BENZIMIDAZOLE COLOR COU-
PLERS
Karl-Heinz Menzel, Leverkusen, and Rolf Pütter, Dussel-
dorf, Germany, assignors to Agfa Aktiengesellschaft,
Leverkusen, Germany, a corporation of Germany
No Drawing. Filed Feb. 7, 1964, Ser. No. 343,196
Claims priority, application Germany, Feb. 14, 1963,
A 42,331
14 Claims. (Cl. 96—56.5)

The invention relates to novel pyrazolo-benzimidazole color couplers and to a process for the production of a colored photographic images, more especially from photographic multi-layer materials using said novel color-couplers.

Color photographic images are generally built up from cyan, magenta and yellow component images. Dyestuffs suitable for this purpose are those whose absorption is restricted to the blue, green or red region of the visible spectrum. Whereas yellow and cyan dyestuffs adequately fulfil this condition, the magenta dyestuffs present difficulties; generally they absorb not only in the green spectral region, but also in the blue. Magenta dyestuffs which are formed by the color coupling of the pyrazolobenzimidazoles described in U.S. Patent 3,061,432 have extraordinarily favorable absorption properties but they have the disadvantage of a relatively low coupling activity. The relatively low acidity of the hydrogen atoms at the coupling position can be assumed to be caused by increased dependence on pH of the coupling reaction. The optimum pH for color-coupling of these couplers lies in the range from 10.5 to 11.5. At lower pH values, too little dyestuff is formed. The known pyrazolobenzimidazoles have, in addition, the disadvantage that they yield inadequate color images when they are incorporated into a silver halide emulsion in the form of a dispersion which is obtained by dissolving the coupler in an organic solvent and dispersing the solution in an aqueous solution of a hydrophilic colloid, such as gelatin.

The invention has for its object to develop color-couplers which are devoid of these disadvantages.

The novel color-couplers of the present invention are pyrazolo-[1,5α]-benzimidazoles which are substituted by an electron attracting substituent, such as a halogen atom, an alkoxy group, or a carboxyl group in the 7-position, and by a halogen atom or a sulfonic acid group in the 3-position.

Such substituents have the effect that the proton on the nitrogen atom in the 4-position, which contributes to the tautomeric equilibrium, is made more labile. The compounds according to the invention have the following general formula:

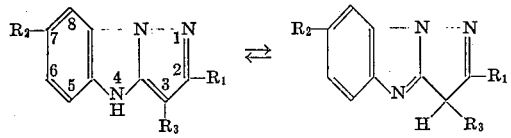

wherein $R_1$ represents a monovalent organic radical, preferably alkyl with 1 to 20 carbon atoms, aryl, for example phenyl, or carboxy.

The carboxyl group can be esterified or the hydroxyl group of the carboxyl group can be replaced by an amino group or a substituted amino group, such as an alkylamine group;

$R_2$ represents an electron attracting substituent, such as a halogen atom, an alkoxy group, a carboxyl group, which may be esterified with an alcohol having 1–18 carbon atoms or which may be present in the form of a carbon amide group, in which the hydrogen atoms of the amide group may be replaced by substituents, such as alkyl groups; and $R_3$ represents a halogen atom or a sulfonic acid group.

Furthermore, the compounds can carry any desired substituents in the positions 5, 6 and 8, advantageously electrophilic substituents such as sulfonic acid, sulfonamide, carboxyl, carbalkoxy, carbonamide groups or halogen atoms.

If the color-couplers according to the invention are to be incorporated into the photographic layer in the form of dispersions, then in accordance with a preferred embodiment of the invention, there are used those color couplers with halogen substituents in the 3-position. Color development then gives magenta images of outstanding quality, particularly in respect of resistance to light and acid. Esters of acetic acid or other carboxylic acids, such as phthalic acid are suitable solvents for these color-couplers.

The color-couplers according to the invention can either be incorporated into the photographic layer or they are added to the color developer solutions.

The usual silver halide emulsion layers are suitable as light-sensitive layers, and these can contain silver chloride, silver bromide or mixtures thereof, possibly with an addition of silver iodide. The conventional, hydrophilic layer-forming colloids, such as gelatin, polyvinyl alcohol, cellulose derivatives, alginic acid derivatives and polyvinyl pyrrolidone, can be used as binding agents. Generally, the color-couplers are added to the green-sensitive layer of a multi-layer color photographic material. Nevertheless, it is, of course, possible to use them in single-layer materials or in the red- or blue-sensitive layers of multi-layer materials.

The color-couplers according to the invention are used in the normal quantities, that is to say, approximately 10 to 20 g. per kg. of casting solution when they are incorporated into the photographic light-sensitive material, or approximately 2 to 5 g. per liter of developer solution.

The color-couplers are in principle produced by the process which is described in U.S. Patent No. 3,061,432, by intramolecular dehydration of 1-(o-amino-phenyl)-pyrazolone-(5) or by deamination of 1-(o-amino-phenyl)-5-amino-pyrazoles according to copending U.S. Patent application Ser. No. 214,144, filed Aug. 1, 1962, now U.S. Patent 3,189,616 granted June 15, 1965.

The substituents R, and $R_2$ are introduced before cyclization and the substituent $R_3$ is subsequently introduced by chlorination or sulfonation.

The usual color-yielding developer substances can be used in the photographic processing, advantageously the usual developers of the p-phenylene diamine type.

EXAMPLE 1

Production of 2-heptadecyl-3,7-dichloropyrazolo-[1,5-α]-benzimidazole, the color coupler of Formula I 20 g. of 4-chloro-1,2-dinitrobenzene are dissolved in 150 cc. of dry alcohol and 10 g. of hydrazine hydrate (100%), are added dropwise at 0° to 10° C., and the mixture is stirred for another hour at 0° C. with cooling. The reaction product crystallises out, is suction-filtered and recrystallised from 400 cc. of methanol. 15 g. of 2-nitro-5-chlorophenylhydrazine, M.P. 164° C. are obtained.

19 g. of 2-nitro-5-chlorophenyl hydrazine and 43 g. of ethyl stearoylacetate are boiled under reflux in 200 cc. of propanol for 1 hour. 10 ml. of concentrated sodium hydroxide solution are then added dropwise and boiling under reflux is continued for another 30 minutes. The reaction mixture is allowed to cool and is poured onto 300 g. of ice and acidified with 20% sulfuric acid. The reaction product precipitates and is suction-filtered, stirred with 1 liter of water, suction-filtered again and washed neutral with water. It is recrystallised from 650 cc. of methanol and there are obtained about 50 g. of 1-(2'-nitro - 5'-chloro-phenyl)-3-heptadecyl-5-pyrazolone, melting at 85° C.

49 g. of the nitropyrazolone are dissolved in 490 cc. of methanol and 10 cc. of 10% sodium hydroxide solution at pH 8. The solution is hydrogenated for 2 hours at 50° C. and 50 atm. in the presence of Raney nickel. The filtrate, freed from catalyst, is neutralized with 3% hydrochloric acid. After cooling, the precipitated product is suction-filtered, and recrystallised from 200 cc. of methanol in the presence of active carbon. 28 g. of 1-(2' - amino-5'-chloro-phenyl)-3-heptadecyl-5-pyrazolone, M.P. 87° C., are obtained.

14 g. of the aminopyrazolone are melted in 1.4 cc. of 20% sulfuric acid for 2 hours at a bath temperature of 110 to 120° C. It is taken up in 100 cc. of methanol and suction-filtered after stirring for 2 hours at room temperature. After recrystallization from ethyl acetate there are obtained 10 g. of 2-heptadecyl-7-chloropyrazolo-[1,5-α]-benzimidazole, melting point 147° C.

10 g. of this pyrazolobenzimidazole are dissolved with gentle heating, in the presence of 2 g. of anhydrous sodium acetate, in 250 cc. of glacial acetic acid. 3.25 g. of sulfuryl chloride are added within 15 minutes at 40° C. Stirring is continued for 1 hour at room temperature and then the reaction mixture is poured into 1 liter of cold water and precipitated by acidification with 3% hydrochloric acid. The precipitate is suction-filtered and washed neutral with water. 10 g. of dry, crude product are recrystallized from 800 cc. of petroleum ether and then from 150 cc. of methanol in the presence of active carbon. 6 g. of 2 - heptadecyl - 3,7-dichloropyrazolo-[1,5α]-benzimidazole. M.P. 115–116° C., are obtained.

$C_{26}H_{39}N_3Cl_2$ calculated: C, 67.24%; H, 8.40%; N, 9.05%; Cl, 15.30%. Mol weight: 464. Found: C, 67.40%; H, 8.36%; N, 9.47%; Cl, 15.05.

*Photographic use.*—3 g. of the above color coupler are dissolved in 30 cc. of ethyl acetate and the solution is added to a mixture of 200 cc. of 5 gelatine and 9 cc. of emulsifier which has been stirred at high speed with a vibratory mixer. An emulsion is formed within 10 minutes and is mixed with 200 cc. of a photographic silver halide emulsion. This is cast by the usual methods onto a support (film or paper) and exposed to light after having dried. After development with p-diethyl-amino aniline, a magenta image is obtained with an absorption maximum at 535 m/μ.

EXAMPLE 2

*Preparation of 2-heptadecyl-3-chloro-7-methoxy-pyrazolo-[1,5-α]-benzimidazole, the color coupler of Formula II*

17 g. of 4-nitro-m-anisidine are suspended in 75 cc. of concentrated hydrochloric acid and stirred for 15 minutes at room tmeperature. 70 cc. of 10% sodium nitrite solution are added dropwise at 0° C. and the mixture is stirred for 1 hour at 0° C. Any unconsumed nitrite is destroyed with sulphamic acid. The diazonium solution is introduced at 0 to 10° C. into a solution of 50 g. of stannous chloride in 50 cc. of concentrated hydrochloric acid and stirred for 2 hours. The product is suction-filtered and recrystallised from 250 cc. of 20% hydrochloric acid giving 22 g. of 2-nitro-5-methoxy-phenylhydrazine hydrochloride, melting at 176° C.

22 g. of this hydrazine are boiled under reflux for 2 hours with 39 g. of ethyl stearoyl acetate, 18 g. of anhydrous sodium acetate, 10 cc. of glacial acetic acid, 100 cc. of water and 500 cc. of isopropanol. 30 cc. of concentrated sodium hydroxide solution are introduced dropwise into the hot reaction solution and the dark brown solution is boiled under reflux for 30 minutes. After cooling, it is stirred into 1 liter of iced water and neutralized with 20% sulfuric acid. The precipitated product is suction-filtered and the yellow paste is stirred with 2 liters of water, suction-filtered and washed with water. The substance is recrystallized from 1 liter of methanol in the presence of active carbon. 30 g. of 1-(2'-nitro-5'-methoxy - phenyl)-3-heptadecyl-5-pyrazolone, M.P. 98° C. are obtained.

25 g. of the nitropyrazolone are suspended in 250 cc. of methanol and the pH is adjusted to 9 with 3 cc. of concentrated sodium hydroxide solution. Hydrogenation is carried out in the presence of Raney nickel at 50° C. and 50 atm. The hydrogenated solution, separated from the catalyst, is strongly acidified with 20% hydrochloric acid. After cooling, it is suction-filtered, washed with a little methanol and recrystallized from 250 cc. of methanol in the presence of active carbon. 20 g. of 1-(2'-amino-5'-methoxyphenyl) - 3-heptadecyl-5-pyrazolone, melting at 175° C. are obtained. 9 g. of the amino-pyrazolone are dissolved in 50 cc. of n-propanol and concentrated hydrochloric acid is added until the solution is weakly acid to Congo Red. It is boiled under reflux for 5 hours and, after cooling, is neutralized with 4% sodium hydroxide solution and diluted with water to twice its volume. A precipitate forms and is suction-filtered, washed with water and recrystallized from 150 cc. of methanol giving 6 g. of 2-heptadecyl-7-methoxy-pyrazolo-[1,5-α]-benzimidazole, melting at 128–129° C.

5.5 g. of this pyrazolobenzimidazole are dissolved in the presence of 1.1 g. of anhydrous sodium acetate in 60 cc. of glacial acetic acid while heating. 1.8 g. of sulfuryl chloride are added dropwise at 40° C. and the mixture is stirred for 1 hour at room temperature. The reaction solution is added to 250 cc. of iced water and acidified with 100 cc. of 3% hydrochloric acid. The substance is suction-filtered and washed with water until neutral leaving 5 g. of the color-coupler of Formula II.

This color-coupler is incorporated into the photographic emulsion in the manner indicated in Example 1. After exposure and development, a magenta image is obtained which has an absorption maximum of 535 m/μ.

EXAMPLE 3

*Production of 2-heptadecyl - 3 - chloro-7-fluoropyrazolo-[1,5-α]-benzimidazole, the color-coupler of Formula III*

26 g. of m-fluoronitrobenzene are suspended in 200 cc. of concentrated sulfuric acid. 132 cc. of 98% nitric acid are added at 0 to 10° C. and the mixture is heated in a water bath for 2 hours. The mixture is then cooled and stirred into 2 liters of iced water. The precipitated 3,4-dinitrofluorobenzene is suction-filtered, washed with water and recrystallized from 220 cc. of isopropanol. Yield 23 g., M.P. 48° C.

23 g. of dinitrofluorobenzene are suspended in 150 cc. of methanol. 12.4 g. of hydrazine hydrate (100%) are added at 0° C. and stirring is continued for 2 hours at 0° C. The 2-nitro-5-fluorophenylhydrazine which crystallises out is suction-filtered, washed with alcohol and recrystallized from 250 cc. of methanol. Yield 15 g., M.P. 129° C.

11 g. of 2-nitro-5-fluorophenylhydrazine ar boiled under reflux for 1 hour with 28 g. of ethyl stearoylacetate in 80 cc. of isopropanol, 6.5 of 45% sodium hydroxide solution are added and the boiling under reflux continues for another 30 minutes. The reaction solution is introduced into iced water and acidified with 20% sulfuric acid. The precipitate is then suction-filtered and washed with water giving 35 g. of crude 1-(2'-nitro-5'-fluorophenyl)-3-heptadecyl-5-pyrazolone. These 35 g. of crude product are dissolved in 350 cc. of methanol and the pH is adjusted to 8 with 10% sodium hydroxide solution. The solution is hydrogenated in the presence of Raney nickel for 2 hours at 50° C. and 50 atm. The filtrate, separated from the catalyst, is treated with 10% sulfuric acid, cooled and suction-filtered. The product is recrystallized from 300 cc. of methanol in the presence of active carbon, giving 28 g. of 1-(2'-amino-5'-fluorophenyl)-3-heptadecyl-5-pyrazolone, melting at 49 to 50° C.

13 g. of the above amino pyrazolone are melted with 1.3 cc. of 20% sulfuric acid for 1½ hours at a bath temperature of 110 to 120° C.; 100 cc. of methanol and some active carbon are then added and the substance is boiled and filtered. 10 g. of 2-heptadecyl-7-fluoro-pyrazolo-[1,5-α]-benzimidazole; M.P. 72° C. are isolated from the filtrate.

5 g. of the pyrazolobenzimidazole as obtained are dissolved in the presence of 1.1 g. of anhydrous sodium acetate in 60 cc. of glacial acetic acid. 1.8 g. of sulfuryl chloride are added at 40° C. and the mixture is stirred for 1 hour at room temperature giving a solution which is added to 250 cc. of iced water and acidified with 100 cc. of 3% hydrochloric acid. A precipitate forms and is suction-filtered and neutralized by washing with water giving 4 g. of the color-coupler of Formula III. After processing this color-coupler as in Example 1, a magenta image is obtained which has an absorption maximum at 535 mμ.

EXAMPLE 4

*Production of 2-heptadecyl-7-methoxypyrazolo-[1,5-α]-benzimidazole-3-sulfonic acid, the color-coupler of Formula IV*

10 g. of the 2-heptadecyl-7-methoxypyrazolo-[1,5-α]-benzimidazole described in Example 2 are stirred for 1 hour at room temperature with 50 cc. of concentrated sulfuric acid and 5 cc. of oleum (20%). The reaction mixture is added to ice and the precipitated color-coupler is filtered off with suction. This is stirred with methanol and once again filtered off with suction. Yield 10 g.

*Photographic use.*—1.5 g. of the color-coupler are suspended in a little methanol. 3 cc. of normal sodium hydroxide solution are added and the coupler is dissolved by adding 30 to 50 cc. of water. The resulting clear solution is made up to 100 cc. with water, mixed with 100 cc. of a photographic silver halide emulsion, brought to a pH of 6.5 to 7 with 10% citric acid and cast in the usual manner on to a support (film or paper). The exposed material, after color development with p-diethylamino aniline, yield a magenta image with an absorption maximum at 530 mμ.

EXAMPLE 5

*Production of 2-heptadecyl - 3 - chloro-7-ethoxypyrazolo-[1,5-α]-benzimidazole, the color-coupler of Formula V*

24 g. of 4-nitro-3-aminophenetol are mixed while stirring with 150 cc. of 20% hydrochloric acid. 92 cc. of a 10% sodium nitrite solution are added dropwise at 0–5° C., and stirring is continued for another hour at 0° C. The diazonium solution is introduced at 0–10° C. into a solution of 65 g. of stannous chloride in 65 cc. of concentrated hydrochloric acid and stirred for two hours at 0° C. After filtering with suction the isolated product is briefly heated on the water bath with 200 cc. of 20% hydrochloric acid, cooled and filtered off with suction. The product is suspended with 500 cc. of water, treated with 25 cc. of concentrated ammonia (pH 8), filtered off with suction and washed neutral with water. The product is recrystallized from 250 cc. of alcohol in the presence of active carbon. About 16 g. of 2-nitro-5-ethoxyphenylhydrazine of the melting point 124 to 125° C. are obtained.

10 g. of 2-nitro-5-ethoxyphenylhydrazine and 19.5 g. of ethylstearoyl acetate ar boiled under reflux in 150 cc. of isopropanol and 10 cc. of glacial acetic acid for 1 hour. 30 cc. of concentrated sodium hydroxide solution are then added and boiling under reflux is continued for another hour. The reaction solution is poured onto a mixture of 500 g. of ice and 50 cc. of concentrated hydrochloric acid. The precipitated product is filtered off with suction and washed neutral with water. The dry product is recrystallized from 200 cc. of methanol in the presence of active carbon. About 16 g. of 1-(2′-nitro-5′-ethoxy)-phenyl-3-heptadecylpyrazolone-(5) of the melting point 90–91° C. are obtained.

16 g. of this nitropyrazolone are suspended in 160 cc. of methanol, adjusted to pH 9 with n-sodium hydroxide solution and hydrogenated in the presence of Raney nickel at 50° C. and 50 atm. The filtrate, separated from catalyst, is mixed with 20% hydrochloric acid, cooled and the precipitated product is filtered off with suction. The product is mixed while stirring with 250 cc. of water, filtered off with suction once more and washed neutral with water. The dry product is recrystallized from 100 cc. of methanol in the presence of active carbon. About 12 g. of 1-(2′-amino - 5′-ethoxy)-phenyl-3-heptadecylpyrazolone-(5) of the melting point 159–160° C. are obtained.

6 g. of the above aminopyrazolone are dissolved in 30 cc. of n-propanol with heating. Concentrated hydrochloric acid is added until the solution is weakly acid to Congo Red and the solution is then boiled under reflux for 5 hours. After adding some active carbon, filtering while hot, the filtrate is mixed with 250 cc. of water. The precipitated product is filtered off with suction and washed neutral with water. About 5 g. of 2-heptadecyl-7-ethoxy-pyrazolo-[1,5-α]-benzimidazole of the melting point 99 to 100° C. are obtained.

13.5 g. of this product are dissolved in 250 cc. of glacial acetic acid in the presence of 2.25 g. of sodium acetate sicc. 3.37 g. of sulfuryl chloride are added dropwise at 20° C. and the solution is then stirred at this temperature for 1 hour. The reaction solution is introduced into 250 cc. of ice water. The product crystallizes after standing overnight in a drying chamber. The product is filtered off with suction and washed neutral with water. About 10 g. of 2-heptadecyl-3-chloro-7-ethoxy-pyrazolo-[1,5-α]-benzimidazole according to Formula V are obtained.

This color coupler is used as described in Example 1. A magenta image with an absorption maximum at 536 m/μ is obtained.

EXAMPLE 6

*Production of 2 - heptadecyl - 3,6,7 - trichloropyrazolo-[1,5-α-]-benzimidazole, the color coupler of Formula VI*

5.5 g. of 2-nitro-4,5-dichlorophenylhydrazine and 8.3 g. of ethyl stearoyl acetate are boiled under reflux in 50 cc. of isopropanol in the presence of 2 g. of sodium acetate sicc., 2.5 cc. of glacial acetate acid and 10 cc. of water. After the dropwise addition of 5 cc. of concentrated sodium hydroxide solution, boiling under reflux is continued for 30 minutes. The reaction mixture is poured onto ice and adjusted to pH 5 with 20% sulfuric acid. The precipitated product is filtered off with suction, washed with water and recrystallized from 350 cc. of methanol in the presence of active carbon. About 7 g. of 1 - (2′ - nitro - 4′,5′-dichloro)-phenyl-3-heptadecylpyrazolone-(5) of the melting point 98° C. are obtained.

31 g. of this substance are suspended in 310 cc. of methanol and adjusted to pH 8 with about 2 cc. of concentrated sodium hydroxide solution. The solution is hydrogenated for 2 hours and 50 atm. in the presence of Raney nickel and heated to 60° C. for 10 minutes. The filtrate, separated from catalyst, is clarified with active carbon, cooled and the amine is precipitated with 20% hydrochloric acid. The product is filtered off with suction, washed neutral with water and the dry product stirred in the cold with 200 cc. of acetone and filtered off with suction once more. About 22 g. of 1-(2′-amino-4′,5′-dichloro)-phenyl - 3 - heptadecylpyrazolone-(5)-hydrochloride of the melting point 140–141° C. are obtained.

13 g. of this product are dissolved in 130 cc. of n-propanol and concentrated hydrochloric acid is added until the solution is weakly acid to Congo Red. The solution is then boiled under reflux for 5 hours, cooled, rendered neutral with n-sodium hydroxide solution, mixed with 300 cc. of water, the precipitated product filtered off with suction, mixed while stirring with 500 cc. of water and the product is filtered off with suction once more. The dry cooled product is recrystallized from 300 cc. of methanol. About 9 g. of 2-heptadecyl-6,7-dichloropyrazolo-[1,5-α]-benzimidazole of the melting point 144° C. are obtained.

5 g. of the above substance are dissolved in 100 cc. of glacial acetic acid in 1 g. of sodium acetate sicc. Under nitrogen 1.5 g. of sulfuryl chloride are added dropwise at 40° C. over 10 minutes. After the addition of the sulfuryl chloride is finished, the product precipitates. The mixture is stirred at room temperature for 1 hour, the product filtered off with suction and washed neutral with water. The product then recrystallizes from 75 cc. of methanol in the presence of active carbon. About 4 g. of the product according ot Formula VI (melting point 66° C.) are obtained.

The color coupler is used as described in Example 1. A magenta image with an absorption maximum at 530 m/μ is obtained.

EXAMPLE 7

*Production of 2-heptadecyl-3-sulfopyrazolo-[1,5-α]-benzimidazole-carboxylic acid-(17), the color coupler of the Formula VII*

36.4 g. of 4-nitro-3-amino-benzoic acid are heated on the water bath for 10 minutes with 200 cc. of concentrated hydrochloric acid. 140 cc. of a 10% sodium nitrated solution are added dropwise at 0 to 5° C. and the mixture is stirred at 0° C. for another 30 minutes. Any nitrous acid which is not consumed is destroyed with sulfamic acid. The diazonium salt is added at 0 to 10° C. to a solution of 100 g. of stannous chloride in 100 cc. of concentrated hydrochloric acid. After stirring at 0° C. for another hour the product is filtered off with suction, heated on the water bath with 150 cc. of a 20% hydrochloric acid, the product is filtered off with suction while hot, extracted by boiling with 150 cc. of isopropanol, cooled and filtered off with suction once more. About 25 g. of 2-nitrophenylhydrazine carboxylic acid-(5) are obtained. 22 g. of this hydrazine and 46 g. of ethyl stearoyl acetate are boiled under reflux for 1 hour in the presence of 10.8 of sodium acetate sicc. and 10 cc. of glacial acetic acid in 150 cc. of water and 200 cc. of isopropanol. 35 cc. of concentrated sodium hydroxide solution are then added dropwise and the solution is boiled under reflux once more for another hour. The product is precipitated by introducing into a mixture of 1 liter of ice water and 150 cc. of 20% hydrochloric acid. The product is filtered off with suction, washed with water and the dry product is extracted by boiling with 750 cc. of methanol. About 30 g. of 1 - (2' - nitro-5'-carboxy)-phenyl-3-heptadecylpyrazolone-(5) of the melting point 143–144° C. are obtained.

30 g. of the nitro compound are dissolved in 150 cc. of tetrahydrofuran, adjusted to pH 9 with 4% sodium hydroxide solution and hydrogenated at 50° C. and 50 atm. in the presence of Raney nickel. The filtrate, separated from catalyst, is mixed with 100 cc. of 20% hydrochloric acid, cooled, filtered off with suction and washed neutral with water. About 25 g. of 1-(2'-amino-5'-carboxy)-phenyl-3-heptadecylpyrazolone-(5) of the melting point 136° C. are obtained.

23 g. of the above product are dissolved in 230 cc. of n-propanol, the solution is rendered acid to Congo Red by addition of 20% hydrochloric acid and heated to boiling for 24 hours. After cooling over night the product crystallized, is filtered off with suction and washed neutral with water. The dry product is recrystallized from 100 cc. of ethyl acetate in the presence of active carbon. About 15 g. of 2-heptadecylpyrazolo-[1,5-α]-benzimidazolo carboxylic acid-(7) of the melting point 125° C. are obtained.

6 g. of this product are introduced at room temperature into a mixture of 30 cc. of concentrated sulfuric acid and 5 cc. of oleum (20%) and stirred for 1 hour. The reaction mixture is then poured onto ice, the precipitated product is filtered off with suction and washed neutral with water. The dry product is extracted by boiling with 100 cc. of acetone, cooled and filtered off with suction. About 5 g. of the product according to Formula VII (melting point 158° C.) are obtained.

$C_{27}H_{41}O_5N_3S$ calculated: C, 62.42%; H, 7.90%; O, 15.41%; N, 8.09%; S, 6.16%. Mol weight: 519. Found: C, 62.22%; H, 8.02%; O, 15.55%; N, 7.99%; S, 5.9%.

The photographic application is equal to that described in Example 4. A magenta image with an absorption maximum at 538 m/μ is obtained.

EXAMPLE 8

*Production of 2-heptadecyl-3-chloropyrazolo-[1,5-α]benzimidazole carboxylic acid propylester-(7), the color coupler, of the Formula VIII*

28 g. of 1-(2'-amino-5'-carboxy)-phenyl-3-heptadecylpyrazolone-(5) are dissolved in 280 cc. of n-propanol, adjusted to pH 3 with 20% hydrochloric acid and boiled under reflux for 12 hours. The solution is introduced into 1 liter of ice water, the product is filtered off with suction and washed neutral with water. About 30 g. of 2-heptadecylpyrazolo - [1,5 - α] - benzimidazole carboxylic acid propylester-(7) of the melting point 115° C. are obtained.

9.8 g. of this compound are dissolved in the presence of 1.8 g. of sodium acetate sicc. in 300 cc. of glacial acetic acid. At 50° C. 1.7 cc. of sulfuryl chloride are added under nitrogen and the solution is stirred at 50° C. for 2 hours under nitrogen. The solution is then introduced with stirring into 1 liter of water, cooled, the product is filtered off with suction and washed neutral. The dry product is stirred in the cold with 100 cc. of methanol and filtered off with suction. About 7 g. of the product according to Formula VIII are obtained.

The product of this color coupler is used as described in Example 1. A magenta image with an absorption maximum at 538 m/μ is obtained.

EXAMPLE 9

*Production of 2-heptadecyl-3-chloro-7-bromopyrazolo-[1,5-α]-benzimidazole, the color coupler of Formula IX*

64 g. of 3,4-dinitro-bromobenzene are dissolved at room temperature in 820 cc. of alcohol. 25.6 g. of hydrazone hydrate are added at 0° C. and the solution is stirred at 0° C. The precipitated product is filtered off with suction, washed neutral with water and dried. After recrystallizing from 700 cc. of methanol about 30 g. of 2-nitro-5-bromophenylhydrazine of the melting point 162° C. are obtained.

12 g. of 2-nitro-5-bromophenylhydrazine and 12.5 g. of ethyl stearoyl acetate are boiled under reflux for 1 hour in 150 cc. of isopropanol. 10 cc. of concentrated sodium hydroxide solution are then added dropwise and the solution is boiled under reflux for another hour. The solution is then poured onto 500 g. of ice and acidified with 20% sulfuric acid. The precipitated product is filtered off with suction and washed neutral with water. The dry product is extracted by boiling with 450 cc. of methanol. The insoluble portion is removed. About 15 g. of 1 - (2' - nitro - 5' - bromo) - phenyl - 3 - heptadecylpyrazolone-(5) of the melting point 88° C. are isolated from the filtrate.

A warm solution of 15 g. of the above nitro compound in 150 cc. of glacial acetic acid is added dropwise to a boiling suspension of 30 g. of iron turnings, 36 cc. of 20% hydrochloric acid and 150 cc. of glacial acetic acid. The reaction mixture is boiled under reflux while stirring for 5 hours, the iron is removed by filtering and the hot solution is introduced into 1.2 liters of ice water. The precipitated product is filtered off with suction, extracted by boiling with 250 cc. of alcohol, the insoluble part being removed. About 10 g. of 2-heptadecyl-7-bromopyrazolo-[1,5-α]-benzimidazole of the melting point 150° C. are isolated from the filtrate.

4 g. of the above product are dissolved with gentle heating in the presence of 0.85 g. of sodium acetate sicc. in 100 cc. of glacial acetic acid. At 40° C. 1.2 g. of sulfuryl chloride are added dropwise under nitrogen and the solution is stirred at room temperature for another hour. The reaction mixture is introduced into 500 cc. of ice water, the precipitated product filtered off with suction and washed with water. The dry product is recrystallized from 200 cc. of methanol in the presence of active carbon. 2–3 g. of 2-heptadecyl-3-chloro-7-bromopyrazolo-[1,5-α]-benzimidazole according to Formula IX (melting point 130° C.) are obtained by isolation.

The photographic use is equal to that described in Example 1. A magenta image with an absorption maximum at 535 m/μ. is obtained.

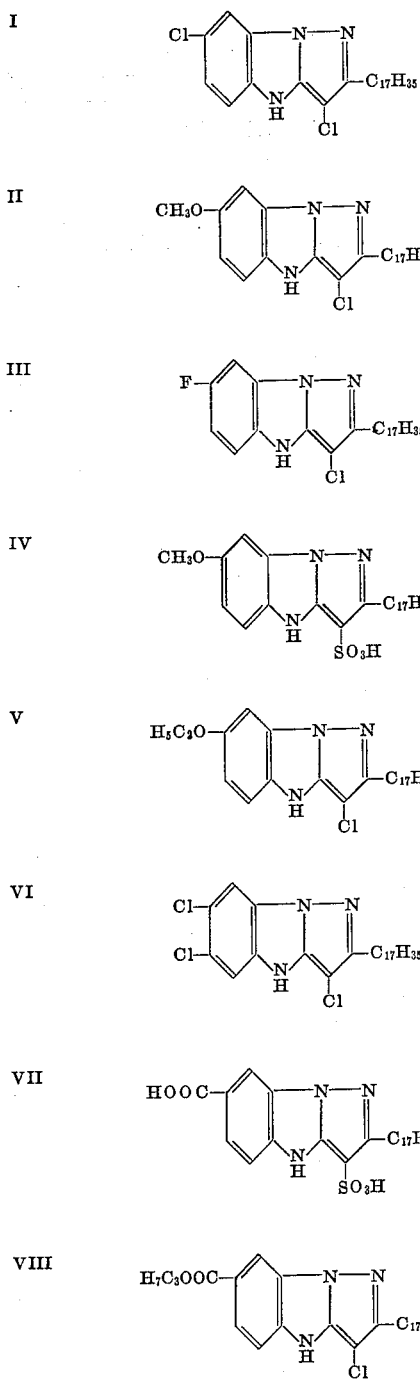

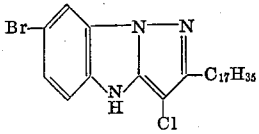

What we claim is:
1. A photographic material comprising a support bearing a silver halide emulsion layer, said silver halide emulsion layer containing as a color coupler a pyrazolo-[1,5-α]-benzimidazole, which is substituted in the 2-position by a monovalent organic radical selected from the group consisting of alkyl having up to 20 carbon atoms, phenyl, carboxyl, esterified carboxyl, carbonamide and alkyl substituted carbonamide, in the 3-position by a substituent selected from the group consisting of a halogen atom and a sulfonic acid group and in the 7-position by an electron attracting group selected from the group consisting of halogen, alkoxy, carboxyl, esterified carboxyl wherein the alcohol has from 1 to 18 carbon atoms, carbonamide and alkyl substituted carbonamide.

2. In a process for the production of color photographic images by developing an exposed silver halide emulsion layer with a color forming developer solution in the presence of a pyrazolo-[1,5-α]-benzimidazole color coupler, the improvement according to which a pyrazolo-[1,5-α]-benzimidazole is used which is substituted in the 2-position by a monovalent organic radical selected from the group consisting of alkyl having up to 20 carbon atoms, phenyl, carboxyl, esterified carboxyl, carbonamide and alkyl substituted carbonamide, in the 3-position by a substituent selected from the group consisting of a halogen atom and a sulfonic acid group and in the 7-position by an electron attracting group selected from the group consisting of halogen, alkoxy, carboxyl, esterified carboxyl wherein the alcohol has from 1 to 18 carbon atoms, carbonamide and alkyl substituted carbonamide.

3. A process according to claim 2, wherein said color coupler is incorporated in the silver halide emulsion layer.

4. The photographic material of claim 1 wherein the monovalent organic radical is alkyl having up to 20 carbon atoms, the substituent in the 3-position is halogen and the electron attracting group is halogen.

5. The photographic material of claim 1 wherein the monovalent organic radical is alkyl having up to 20 carbon atoms, the substituent in the 3-position is halogen and the electron attracting group is lower alkoxy.

6. The photographic material of claim 1 wherein the monovalent organic radical is alkyl having up to 20 carbon atoms, the substituent in the 3-position is sulfonic acid and the electron attracting group is carboxyl.

7. The photographic material of claim 1 wherein the monovalent organic radical is alkyl having up to 20 carbon atoms, the substituent in the three position is halogen and the electron attracting group is esterified carboxyl wherein the alcohol has from 1 to 18 carbon atoms.

8. The process of claim 2 wherein the monovalent organic radical is alkyl having up to 20 carbon atoms, the substituent in the 3-position is halogen and the electron attracting group is halogen.

9. The process of claim 2 wherein the monovalent organic radical is alkyl having up to 20 carbon atoms, the substituent in the 3-position is halogen and the electron attracting group is lower alkoxy.

10. The process of claim 2 wherein the monovalent organic radical is alkyl having up to 20 carbon atoms, the substituent in the 3-position is sulfonic acid and the electron attracting group is carboxyl.

11. The process of claim 2 wherein the monovalent organic radical is alkyl having up to 20 carbon atoms, the substituent in the three position is halogen and the electron attracting group is esterified carboxyl wherein the alcohol has from 1 to 18 carbon atoms.

12. The photographic material of claim 1 wherein the pyrazolo-[1,5-α]-benzimidazole has the following formula:

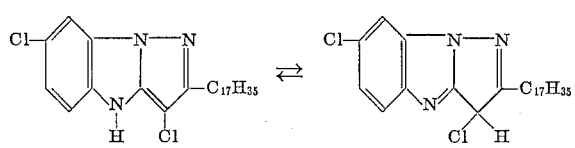

13. The photographic material of claim 1 wherein the pyrazolo-[1,5-α]-benzimidazole has the following formula:

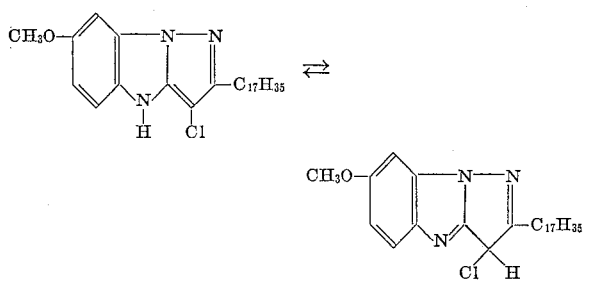

14. The photographic material of claim 1 wherein the pyrazolo-[1,5-α]-benzimidazole has the following formula:

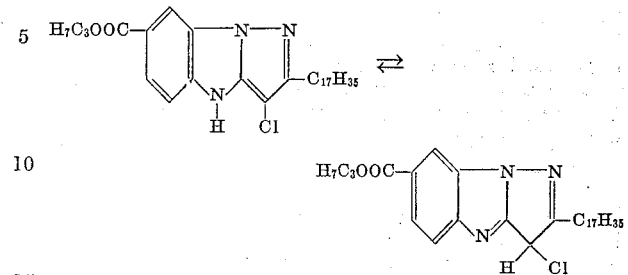

References Cited
UNITED STATES PATENTS

| | | | |
|---|---|---|---|
| 3,189,616 | 6/1965 | Loffler et al. | 96—100 |
| 3,105,837 | 10/1963 | Ursprung | 260—309.2 |
| 3,113,948 | 12/1963 | Zellner | 260—309.2 |
| 3,061,432 | 10/1962 | Menzel et al. | 96—55 |
| 3,079,255 | 2/1963 | Wahl et al. | 96—55 |

FOREIGN PATENTS 572,971  5/1959  Belgium.

J. TRAVIS BROWN, *Acting Primary Examiner.*
NORMAN G. TORCHIN, *Assistant Examiner.*